United States Patent
Searer et al.

(10) Patent No.: US 9,821,774 B1
(45) Date of Patent: Nov. 21, 2017

(54) METHOD AND APPARATUS FOR JACKSCREW WITH INTEGRAL DRIVE NUT GREASE FITTING

(71) Applicants: Craig Alan Searer, Elkhart, IN (US); Randall James Clay, Elkhart, IN (US); David W. Busch, Fort Wayne, IN (US)

(72) Inventors: Craig Alan Searer, Elkhart, IN (US); Randall James Clay, Elkhart, IN (US); David W. Busch, Fort Wayne, IN (US)

( * ) Notice: Subject to any disclaimer, the term of this patent is extended or adjusted under 35 U.S.C. 154(b) by 653 days.

(21) Appl. No.: 14/195,014

(22) Filed: Mar. 3, 2014

Related U.S. Application Data

(60) Provisional application No. 61/772,323, filed on Mar. 4, 2013.

(51) Int. Cl.
*F16H 57/04* (2010.01)
*B60S 9/08* (2006.01)
(Continued)

(52) U.S. Cl.
CPC ....... *B60S 9/08* (2013.01); *B66F 3/08* (2013.01); *B66F 3/44* (2013.01); *F16H 25/20* (2013.01);
(Continued)

(58) Field of Classification Search
CPC ..... B60D 1/66; B60D 1/46; B66F 3/08; B66F 7/14; B66F 3/10; B66F 3/28; B66F 3/44; B60S 9/16; B60S 9/08; F16H 25/20; F16H 25/24; F16H 57/029; F16H 57/0497; F16H 25/2204; F16H 57/0464; F16N 1/00
USPC ... 254/419, 425, 7 R, 13, 98, 420, 100, 103, 254/97, 102; 74/467, 89.43, 89.44, 89.4, 74/44, 960, 89.23; 411/960
See application file for complete search history.

(56) References Cited

U.S. PATENT DOCUMENTS

| | | | | | |
|---|---|---|---|---|---|
| 1,453,532 | A | * | 5/1923 | Stevens | F01L 15/10 74/467 |
| 2,352,117 | A | * | 6/1944 | Pasternack | B66F 3/08 254/98 |

(Continued)

FOREIGN PATENT DOCUMENTS

| DE | 102009016928 | | * 10/2009 |
|---|---|---|---|
| DE | 102009016928 | A1 | * 10/2009 |

(Continued)

OTHER PUBLICATIONS

Ultra-Fab Products, UF38-944037.*

*Primary Examiner* — Larry E Waggle, Jr.
*Assistant Examiner* — Mahdi H Nejad
(74) *Attorney, Agent, or Firm* — Rick B. Yeager

(57) ABSTRACT

An improved device and method of lubrication for a tongue jack, 5th wheel jack, or other jack or other threaded positioning device. Ports are provided in the inner and outer tubes of the jack. The aligned ports provide access to a lubrication cavity in the jacknut. The lubrication cavity may include a grease fitting such as a zerk fitting. When the ports are in alignment, a grease gun can be inserted easily to the zerk fitting to apply grease to the interior structure of the nut as well as to the threads of the jackscrew. The lubricant may be introduced directly at a region of contact between a screw and the load bearing element. Applicant's test results show that this improved lubrication can increase the life cycle of the jack by more than 100%.

11 Claims, 8 Drawing Sheets

(51) Int. Cl.
*B66F 3/08* (2006.01)
*B66F 3/44* (2006.01)
*F16N 1/00* (2006.01)
*F16H 25/22* (2006.01)
*F16H 25/20* (2006.01)

(52) U.S. Cl.
CPC ..... *F16H 25/2204* (2013.01); *F16H 57/0497* (2013.01); *F16N 1/00* (2013.01); *Y10T 74/18576* (2015.01); *Y10T 74/18744* (2015.01)

(56) References Cited

U.S. PATENT DOCUMENTS

| | | | | |
|---|---|---|---|---|
| 2,430,405 A * | 11/1947 | Millns | ............... | F16H 25/20 192/143 |
| 2,448,232 A * | 8/1948 | Muse | ............... | F16L 15/02 285/11 |
| 2,506,634 A * | 5/1950 | Fields | ............... | B66F 3/08 254/98 |
| 2,586,222 A * | 2/1952 | Hamilton | ............... | B25B 27/06 29/244 |
| 2,708,374 A * | 5/1955 | Engh | ............... | B66F 3/08 184/6 |
| 2,885,181 A * | 5/1959 | McCully | ............... | B60S 9/08 16/19 |
| 3,426,752 A * | 2/1969 | Laico | ............... | A61F 15/02 29/239 |
| 4,201,271 A * | 5/1980 | Evans | ............... | B23Q 1/70 173/146 |
| 6,926,261 B1 * | 8/2005 | Renshaw | ............... | B60D 1/66 254/419 |
| 8,495,924 B2 * | 7/2013 | Fukano | ............... | F16H 25/2454 254/98 |
| 8,601,891 B2 * | 12/2013 | Bochen | ............... | F16H 25/2015 74/89.37 |
| 2008/0099743 A1 * | 5/2008 | Arzouman | ............... | B66F 3/12 254/8 B |
| 2009/0260463 A1 * | 10/2009 | Fukano | ............... | F16H 25/2454 74/89.33 |
| 2011/0005386 A1 * | 1/2011 | Sauer | ............... | F16H 57/0497 92/153 |
| 2014/0000395 A1 * | 1/2014 | Schwarzbach | ............... | F16H 25/12 74/89.44 |
| 2014/0116166 A1 * | 5/2014 | Yamamoto | ............... | F16H 25/2204 74/89.4 |
| 2014/0157919 A1 * | 6/2014 | Kondo | ............... | F16H 25/20 74/89.23 |
| 2015/0176686 A1 * | 6/2015 | Lecluse | ............... | F16H 25/20 74/89.39 |
| 2015/0330497 A1 * | 11/2015 | Amano | ............... | H02K 7/06 74/89.41 |
| 2016/0215870 A1 * | 7/2016 | Chakkera | ............... | F16H 57/0471 |

FOREIGN PATENT DOCUMENTS

| | | | |
|---|---|---|---|
| DE | 102012203632 | * | 8/2012 |
| DE | 102012203632 | * | 9/2013 |
| DE | 102012203632 A1 * | | 9/2013 |
| EP | 2491273 B1 | * | 9/2010 |
| EP | 2491273 B1 | * | 8/2012 |
| JP | 2015001258 A | * | 1/2015 |
| WO | WO 2011047779 A1 | * | 4/2011 |
| WO | WO2013-008539 | * | 1/2013 |
| WO | WO 2014115648 A1 | * | 7/2014 |

* cited by examiner

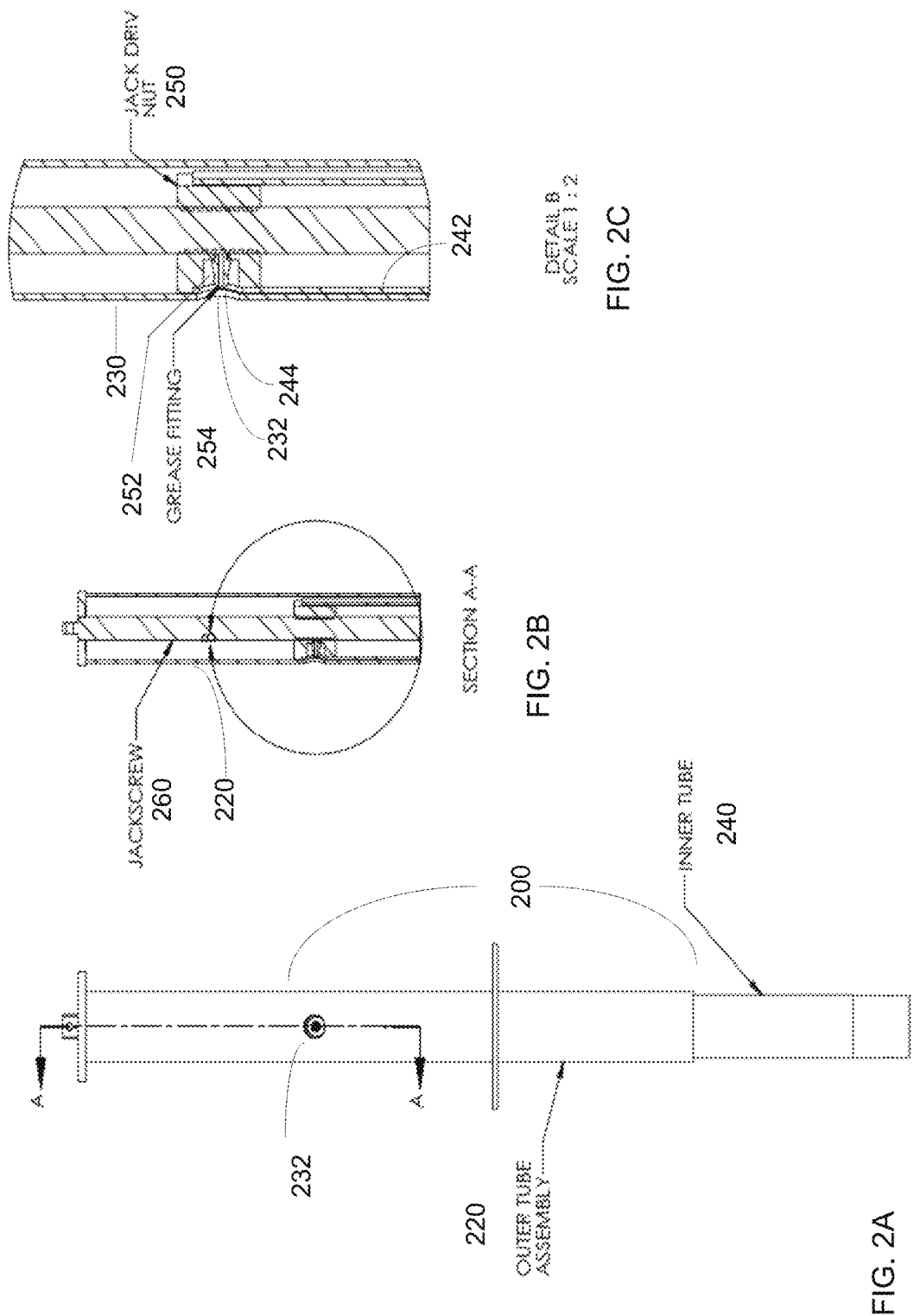

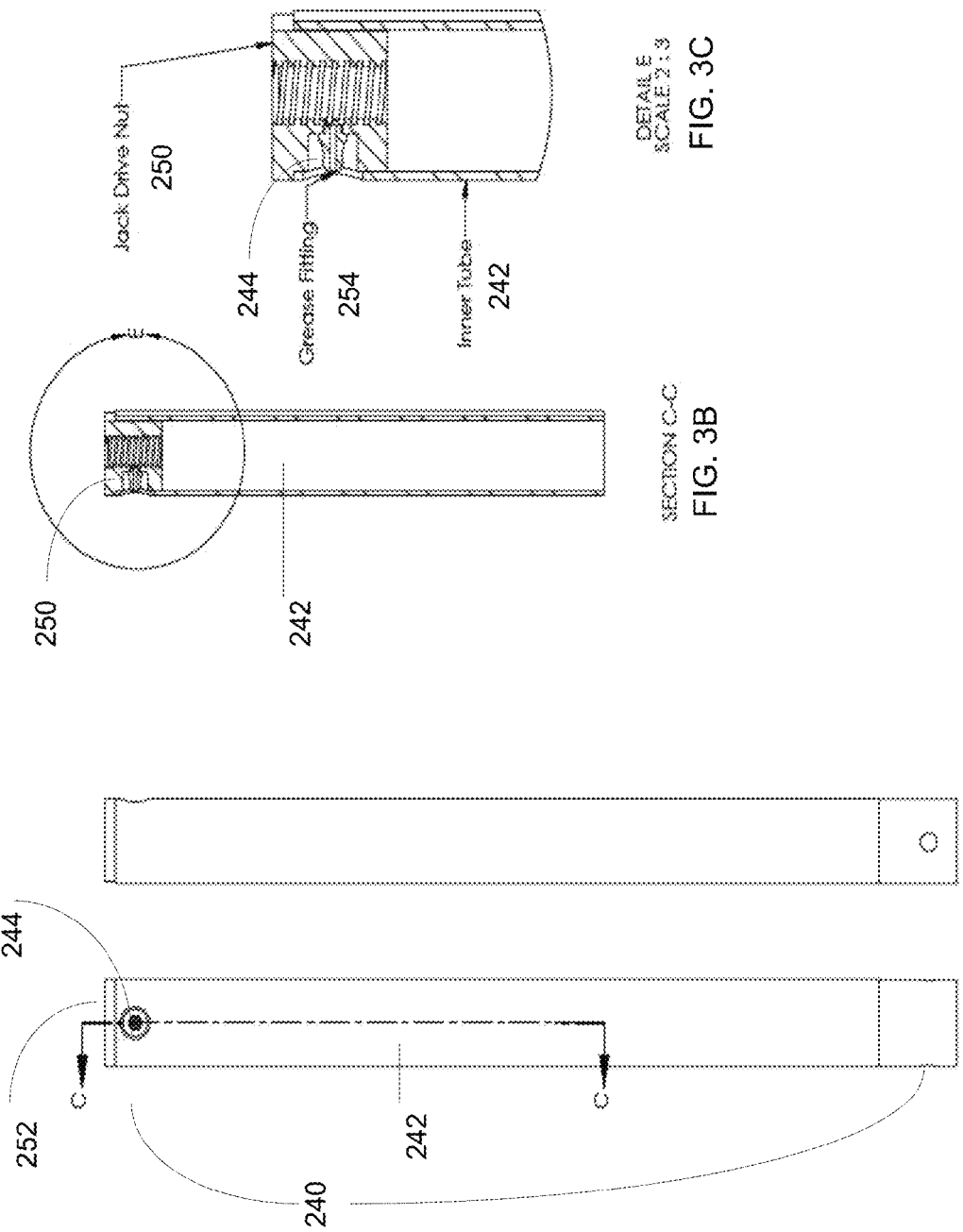

| No. | Part No. | Description | Q'ty |
|---|---|---|---|
| 1 | 38-752002 | Gear Housing Cover | 1 |
| 2 | 38-751154 | Pinion Key 3x6 | 1 |
| 3 | 38-751070 | Screw – PPH M4x16 | 4 |
| 4 | 38-751010 | Screw – PPH M4x12 | 4 |
| 5 | 38-752005 | Motor Housing | 1 |
| 6 | 38-752004 | Light Housing | 1 |
| 7 | 38-752007 | Light Lens | 1 |
| 8 | 38-751039 | Switch Boot | 1 |
| 9 | 38-751037 | Motor Switch – on/off/on 250V 32A | 1 |
| 10 | 38-751057 | Light Switch – on/off 125/250V 6A | 1 |
| 11 | 38-752008 | Motor 150W 12VDC | 1 |
| 12 | 38-751118 | Spur Gear 96T | 1 |
| 13 | 38-751124 | Pinion Gear 12T | 1 |
| 14 | 38-751085 | Main Gear 89T | 1 |
| 15 | 38-751114 | Rubber Plug | 1 |

| Part No. | Description | Q'ty |
|---|---|---|
| 38-751167 | Socket 9/16" Deep Well / Manual Override | 1 |
| 38-751034 | 250V 30A Slow-Blow Fuse | 1 |
| 38-751035 | Fuse Holder | 1 |

NOT SHOWN

LOWER STEM ASSEMBLY

| No. | Part No. | Description | Q'ty |
|---|---|---|---|
| 1 | 38-751104 | 2.25" Outer Tube | 1 |
| 2(A-G) | 38-751159 | 2" Inner Tube Assembly | 1 |
| 2A | 38-752018 | Retaining Pin 5mm | 1 |
| 2B | 38-752019 | Washer Spacer AS1730 | 1 |
| 2C | 38-751138 | Cotter Pin | 1 |
| 2D | 38-751127 | Upper Pin | 1 |
| 2E | 38-751122 | Collar Hex Head | 1 |
| 2F | 38-751121 | Thrust Bearing | 1 |
| 2G | 17-753230 | Grease Zerk 6-1.0mm | 1 |
| 3 | 38-751101 | Footpad Adjustable2.25"(U4000) | 1 |
| 4 | 38-141023 | Wire Lock Pin | 1 |

38-751168 Lower Stem Assembly (Includes #1 & #2)

METHOD AND APPARATUS FOR JACKSCREW WITH INTEGRAL DRIVE NUT GREASE FITTING

This US non-provisional patent application is related to U.S. Provisional Application No. 61/772,323 filed by applicants on Mar. 4, 2014 and claims the priority of that filing date.

BACKGROUND

Field of Invention

The current invention relates to an apparatus and method for improving jack lubrication by providing a jack with external access to a grease fitting provided in a drive nut Prior Art Prior art jack designs typically require either partial disassembly of the jack in order to access parts for lubrication, or they attempt to provide grease fittings in proximity to a jack drive nut.

For example, U.S. Pat. No. 6,926,261 to Renshaw describes a trailer tongue jack includes a grease (or zerk) fitting for providing grease to internal parts The jack includes an outer tube and an inner telescoping tube. A threaded insert (or nut) is fixedly attached inside an upper end of the inner telescoping tube. A screw shaft threadedly cooperates with the insert to extend or retract the inner telescoping tube from a lower end of the outer tube. A crank or motor gear assembly is provided to turn the screw shaft either directly or through gears, and a thrust bearing carries a vertical load between the screw shaft and the outer tube.

SUMMARY OF INVENTION

The current invention provides improved devices and methods of lubrication of a tongue jack, 5th wheel jack, or other jack or other threaded positioning device. In one embodiment, the methods comprise positioning one or more grease fittings, such as a zerk fitting, within a jack nut, ball bearing nut, or other screw load bearing element so that a lubricant may be introduced directly at a region of contact between a screw and the load bearing element. Prior art grease fittings are typically provided at fixed external access points on a threaded positioning device. For example, FIG. 1 is a prior art tongue jack with a lubrication fitting 34 provided in the outer tube of a jack screw.

In other embodiments, the methods comprise providing access to a lubrication port so that lubricants such as oil, dry graphite, or other lubricating agents may be introduced directly at a region of contact between a screw and the load bearing element.

The current invention extends the life cycle of tongue jacks, 5th wheel jacks, and other jack devices. One of the root causes for a tongue jack to fail is that the grease wears away from the jackscrew and nut resulting in too much friction for the motor to overcome. This increased friction can cause the jackscrew to jam in the jack drive nut or cause the motor to overheat and fail. Another cause for failure is that with repeated use, the grease used for lubrication will breakdown and no longer provide the lubrication necessary between the jackscrew and nut to allow the jackscrew to thread its way through the nut. This lubrication breakdown causes too much friction for the motor to overcome, and causes jackscrew freezing in the nut.

By applying grease directly to the interior threads of the nut through the zerk fitting, grease can be applied to both the interior threads of the nut and the jack screw threads. Applicant's test results show that this improved lubrication can increase the life cycle of the jack by more than 100%.

Ports are provided in the inner and outer tubes, and when the ports are in alignment, a grease gun can be inserted easily to the zerk fitting to apply grease to the interior structure of the nut as well as to the threads of the jackscrew.

The position of the port in the outer tube is preferably located in the area of the jackscrew that is used the most when lifting a trailer off the hitch ball or hitch pin as the jack is extending.

In one embodiment of the current invention, an electric jackscrew comprises a grease zerk provided in the jackscrew drive nut. The zerk fitting is accessed when a port in the jack's outer tube is aligned with a port in the jack's inner tube, thereby exposing a grease fitting which is provided in a recess in the jack nut. Grease introduced through this fitting is specifically applied to the inner nut and jack screw and directly lubricates the jackscrew at the region where it contacts the jack nut.

In another embodiment of the current invention, a manual jackscrew is provided with outer tube and inner tube access ports which provide access to a grease fitting which is provided in a recess in the jack nut.

In another embodiment of the current invention, a grease fitting is provided for a ball screw trailer jack so that grease may be introduced directly to the ball bearings.

DESCRIPTION OF FIGURES

FIG. 2A is a side view of a jackscrew assembly comprising an outer tube assembly and an inner tube assembly.

FIG. 2B is a cross section view of the upper portion of the jackscrew assembly of FIG. 2A showing a jackscrew.

FIG. 2C is a detailed cross section view of aligned access ports in the outer tube and inner tube of the jackscrew assembly of FIG. 2A to provide access to a grease fitting in the jack drive nut.

FIG. 3A is a side view of the inner tube assembly of the jackscrew assembly of FIG. 2A.

FIG. 3B is a cross section view of the upper portion of the inner tube of FIG. 3A.

FIG. 3C is a detailed view of the top of the inner tube of FIG. 3B showing the inner tube access port and the grease fitting.

Figure 1:
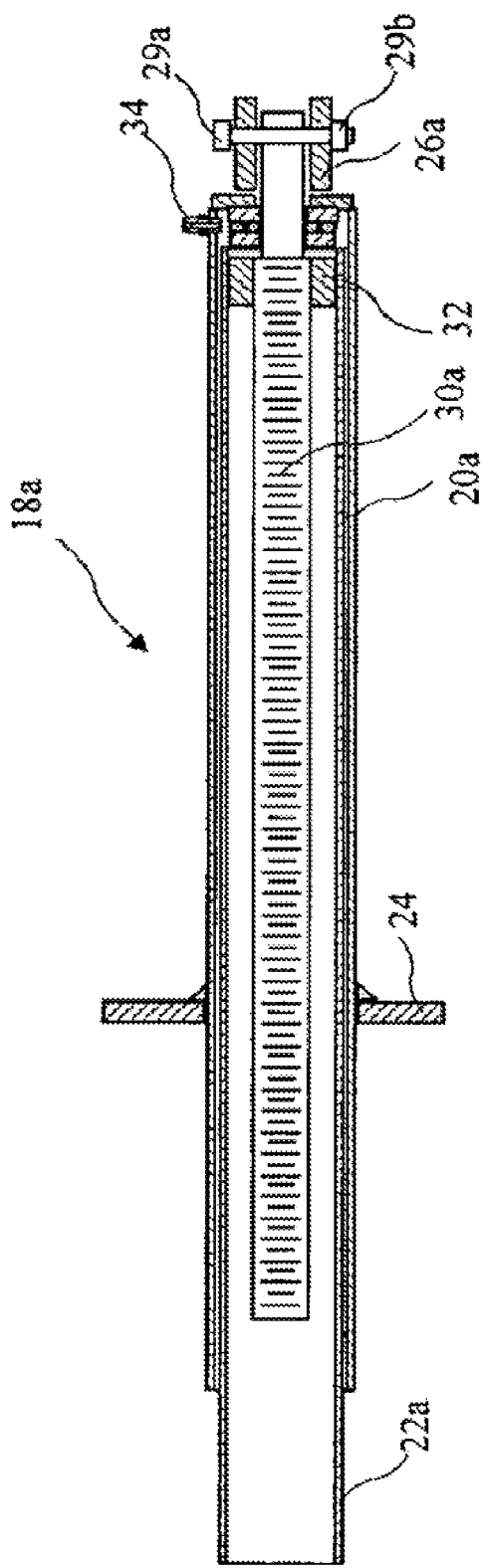
FIG. 1 is a side cross section view of a prior art jackscrew.

DETAILED DESCRIPTION OF EMBODIMENT—JACKSCREW WITH GREASE FITTING IN JACK Drive Nut The following example element list is provided for convenience in referencing the figures.

---
Element list electric tongue jack 101
    motor gear assembly 400
    lower stem assembly 300
  jackscrew assembly 200
    outer tube assembly 220
      outer tube 230
        outer tube access port 232
      inner tube assembly 240
        inner tube 242
          top 243
          inner tube access port 244
        jack drive nut 250
          jack drive nut top 251
            lubrication cavity 252
              grease fitting 254
      jackscrew 260
  5th wheel jack jackscrew assembly 201
    outer tube assembly 221
      outer tube 231
        outer tube access port 233
    inner tube assembly 241
      inner tube 245
        inner tube access port 248
      jack drive nut 255
        lubrication cavity 256
          grease fitting 259
      jackscrew 261
    washer 510
    ball bearings 520
    shaft pin 522
    support 540
    clip 542
    pin 544

---

FIG. 2A is a side view of a jackscrew assembly 200 comprising an outer tube assembly 220 and an inner tube assembly 240. An outer tube access port 232 is provided in the outer tube assembly for applying a lubricant to the jacknut, such as by greasing a zerk fitting 254.

FIG. 2B is a cross section view of the upper portion of the jackscrew assembly 200 of FIG. 2A showing a jackscrew 260.

FIG. 2C is a detailed cross section view of the outer tube 230, an inner tube 242, a jack drive nut 250 with a grease fitting 254, such as a zerk fitting, provided in a lubrication cavity 252. In this embodiment, the nut grease fitting recess 252 is fixed relative to an inner tube access port 244. When the inner tube access port 244 is aligned with the outer tube assembly access port 232, the orientation permits grease or other lubricant to be applied directly to the jacknut. In this example, the lubricant is grease which is applied through the grease fitting 254 at the region of maximum stress and wear in the jackscrew assembly.

FIG. 3A is a side view of the inner tube assembly 240 of the jackscrew assembly 200 of FIG. 2A. FIG. 3A shows the inner tube 242, inner tube access port 244, and the top 251 of the jack drive nut 250.

FIG. 3B is a cross section view of the upper portion of the inner tube 242 and jack nut 250.

FIG. 3C is a detailed view of the top of the inner tube 242 and the jack nut 250 showing the inner tube access port 244 and the grease fitting 254. In other examples, the grease fitting 254 may be omitted, and the drive nut includes a lubrication cavity 252 where oil, dry graphite, or other lubricant may be introduced to lubricate the jack nut. This lubrication cavity is in communication with the jackscrew, such as with an orifice or lubrication channel that permits the lubricant to reach the jackscrew.

Figure 4B:
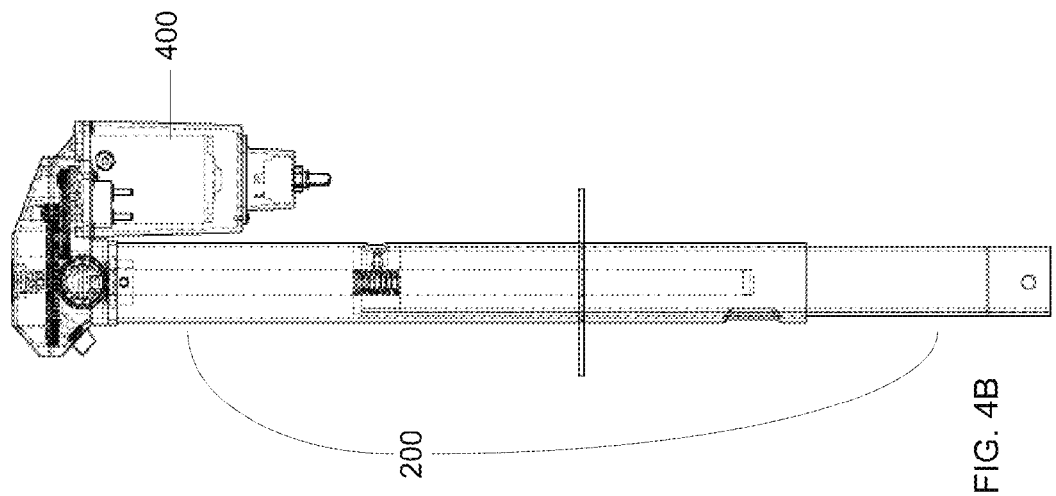
FIG. 4B is a side view of the electric tongue jack of FIG. 4A.
Figure 4A:
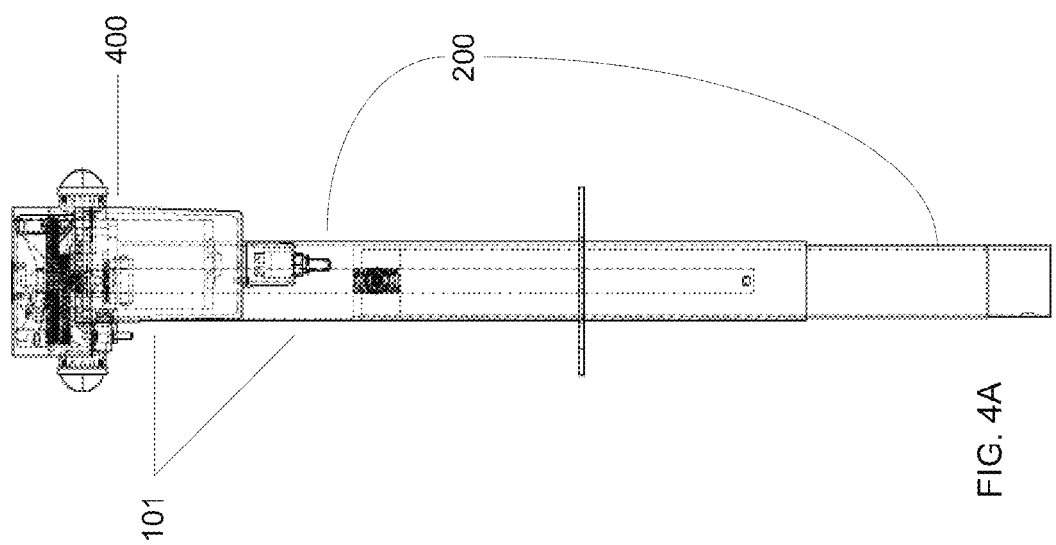
FIG. 4A is a front view of an electric tongue jack with a motor gear assembly and the jackscrew assembly of FIG. 2A.

FIG. 4A is a front view of an electric tongue jack 101 with a motor gear assembly 400 and the jackscrew assembly 200 of FIG. 2A.

FIG. 4B is a side view of the electric tongue jack of FIG. 2A.

Example—Electric Tongue Jack with Grease Fitting in Jack Drive Nut

Figure 5:
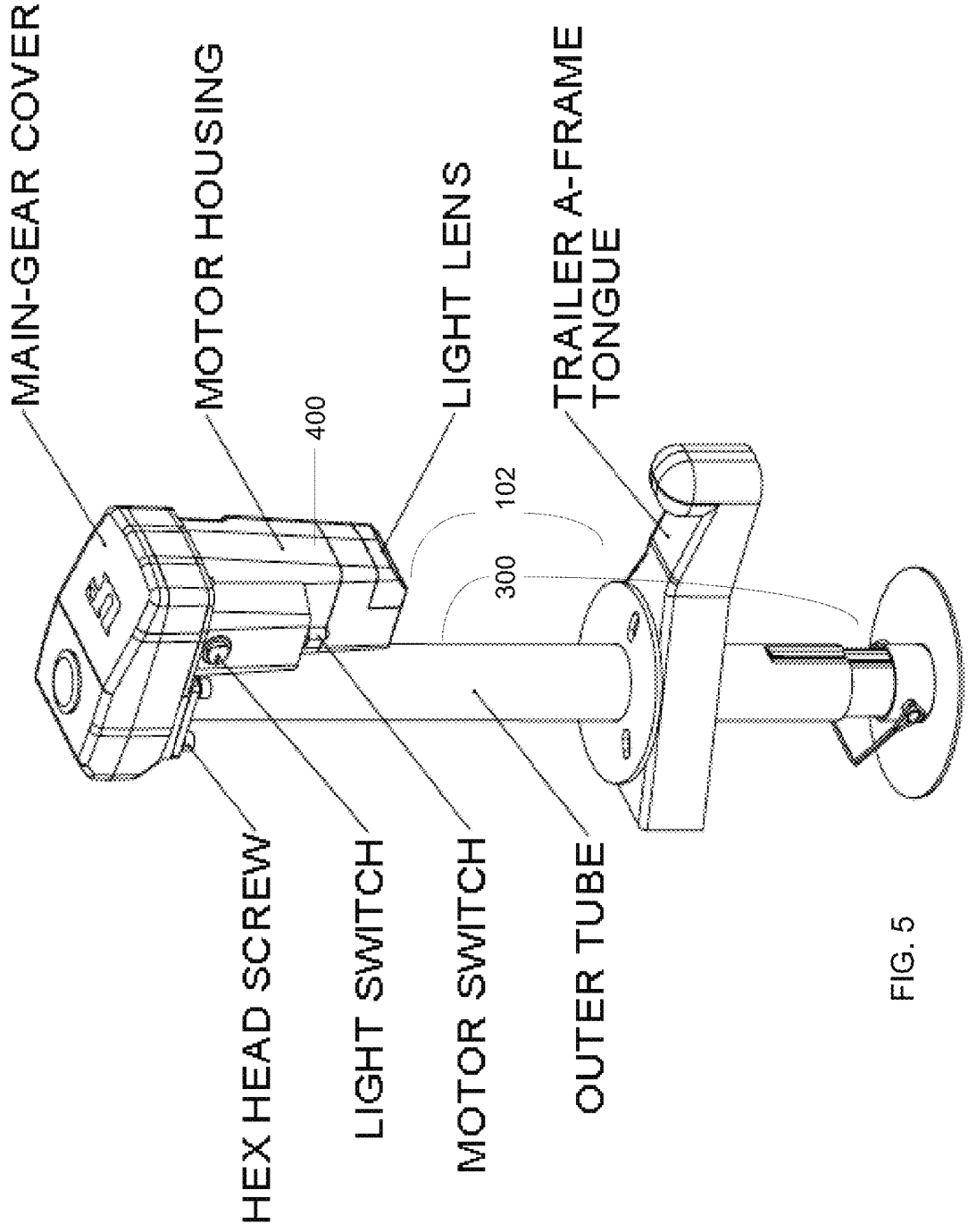
FIG. 5 is a side perspective view of a trailer electric tongue jack comprising a motor gear assembly and a lower stem assembly.

FIG. 5 is a side perspective view of an electric tongue jack 102 for a trailer comprising a motor gear assembly 400 and a lower stem assembly 300.

Figure 6:
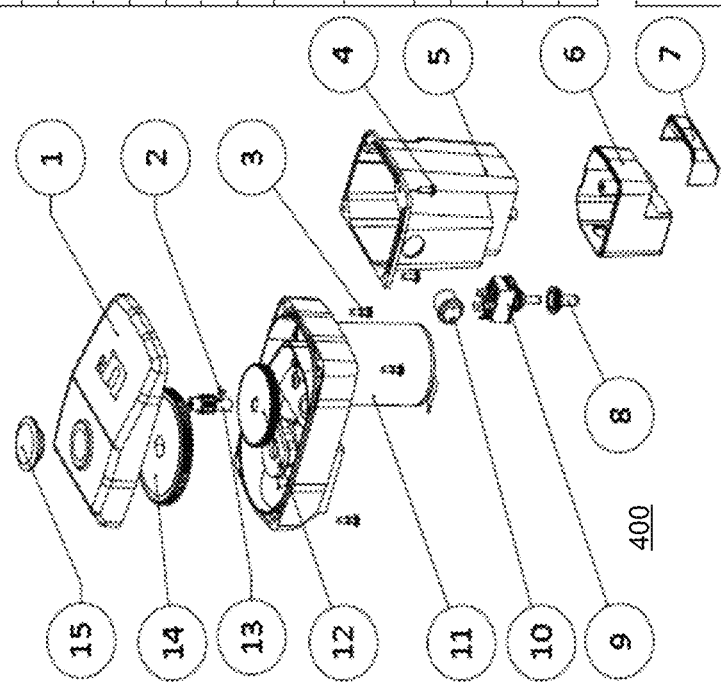
FIG. 6 is an exploded view of the motor gear assembly of the electric tongue jack of FIG. 5.

FIG. 6 is an exploded view of the motor gear assembly 400 of the electric tongue jack of FIG. 5.

Figure 7:
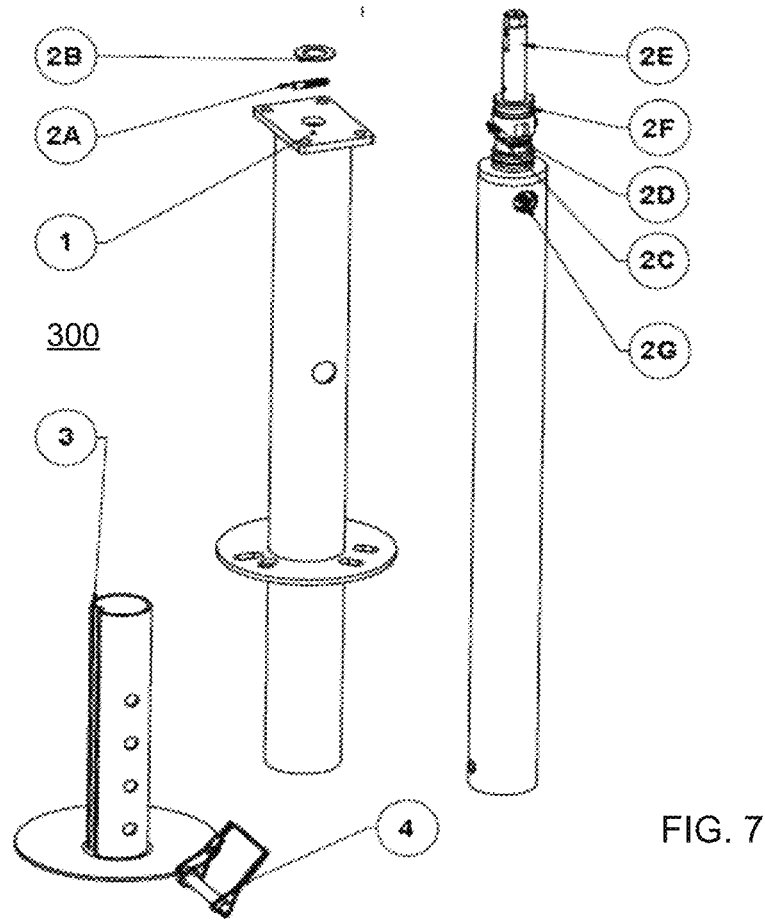
FIG. 7 is an exploded view of the lower stem assembly of the electric tongue jack of FIG. 5.

FIG. 7 is an exploded view of the lower stem assembly 300 of the electric tongue jack of FIG. 5.

In this example, the jackscrew is lubricated by extending the jack until the zerk grease fitting is aligned with the access port in the outer tube. Using a standard grease gun, one or more pumps of grease are applied through the grease fitting.

Example—Manual Tongue Jack with Grease Fitting in Jack Drive Nut

In this example, the electric drive of the previous example is replaced with a manual crank. Lubrication is provided as described above by aligning the outside tube access port with the grease fitting.

Example—5th Wheel Jack

Figure 8B:
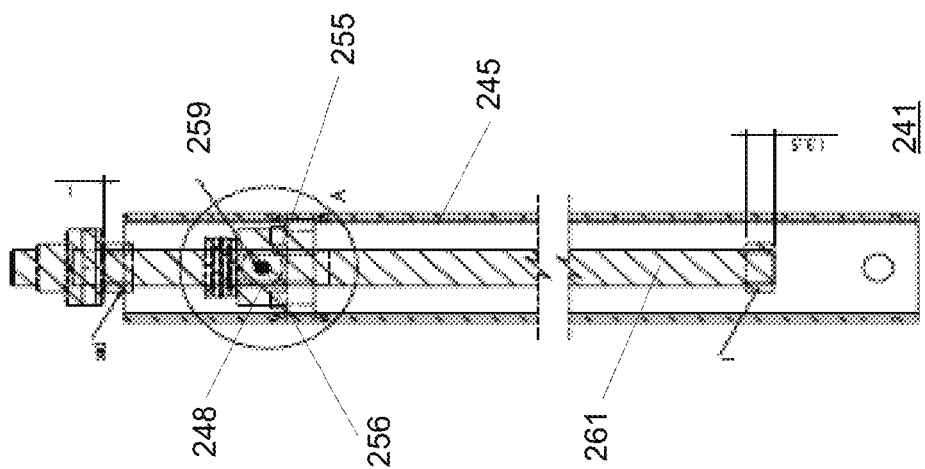
FIG. 8B is a cross sectional view of the inner tube, jackscrew, jack nut, and inner tube access port for the 5th wheel jackscrew assembly of FIG. 8A.
Figure 8A:
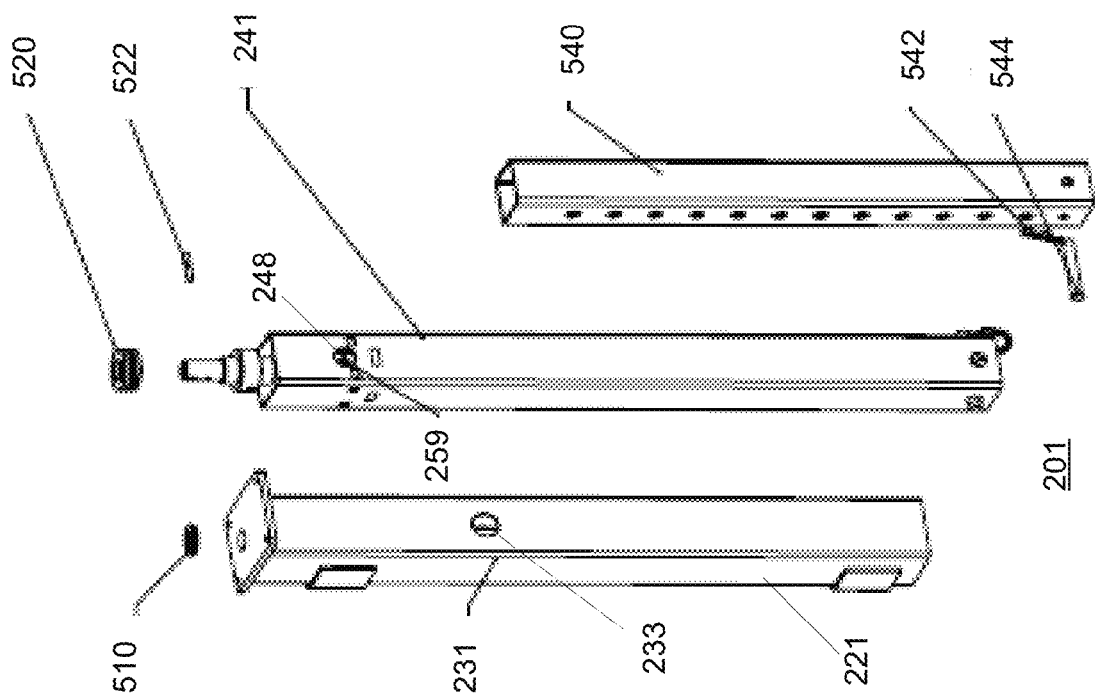
FIG. 8A is an exploded view of jackscrew assembly for a 5th wheel jack, comprising an outer tube assembly and an inner tube assembly.

FIG. 8A is an exploded view of a 5th wheel jackscrew assembly 201 for a 5th wheel jack. The outer tube assembly 221 comprises an outer tube 231 with an outer tube access port 233. The inner tube assembly 241 comprises inner tube 245 with an inner tube access port 248 which provides access to grease fitting 259 positioned in lubrication cavity 256. Other elements in the 5th wheel jackscrew assembly include washer 510, ball bearings 520, shaft pin 522, support 540, clip 542, and pin 544.

FIG. 8B is a cross sectional view of the inner tube 245, jackscrew 261, jack drive nut 255, and inner tube access port 248 for the 5th wheel jackscrew assembly of FIG. 8A.

In this example, a grease fitting 259 is provided in lubrication cavity 256. When the inner tube access port 248 is aligned with the outer tube access port 233, the grease fitting is accessible.

Method of Lubrication

In one example, a jack is lubricated before leaving the factory. Under normal conditions, lubrication will be needed periodically, such as annually.

A lubricant can be applied to the jackscrew by extending the inner tube by means of operating the motor or manually rotating crank until the port in the outer tube is aligned with the port in the inner tube. This alignment exposes the grease fitting or lubrication cavity.

Once the ports are in alignment, grease or other lubricant can be applied through a grease gun or other lubricant application device directly to the inner threads of the threaded nut and the jackscrew threads. One means of lubricant application can be accomplished by use of a standard grease gun through a grease fitting or zerk in the threaded nut by one or more pumps of the grease gun.

It is to be understood that the specific embodiments and examples described above are by way of illustration, and not limitation. Various modifications may be made by one of ordinary skill, and the scope of the invention is as defined in the appended claims.

What is claimed is:

1. A jackscrew assembly comprising
an outer tube assembly comprising an outer tube with an outer tube access port;
an inner tube assembly, slidable with respect to the outer tube assembly, the inner tube assembly comprising
an inner tube comprising an inner tube access port,
a threaded jack drive nut fixed relative to the inner tube, the jack drive nut comprising
a recessed lubrication cavity, the lubrication cavity comprising a grease fitting such that the inner tube access port is aligned with the lubrication cavity grease fitting, and
a jackscrew threaded through the jack drive nut, such that the outer tube access port is configured to be alignable with the inner tube access port in order for a lubricant to be applied to the lubrication cavity grease fitting.

2. The jackscrew assembly of claim 1 wherein the grease fitting is a zerk fitting.

3. The jackscrew assembly of claim 1 wherein the jack drive nut engages a plurality of ball bearings.

4. A trailer jack comprising a
jackscrew assembly comprising
an outer tube assembly comprising an outer tube with an outer tube access port;
an inner tube assembly, slidable with respect to the outer tube assembly, the inner tube assembly comprising
an inner tube comprising an inner tube access port,
a threaded jack drive nut fixed relative to the inner tube, the jack drive nut comprising a recessed lubrication cavity, the lubrication cavity comprising a grease fitting, such that the inner tube access port is aligned with the lubrication cavity grease fitting, and
a jackscrew threaded through the jack drive nut, such that the outer tube access port is configured to be alignable with the inner tube access port in order for a lubricant to be applied to the lubrication cavity grease fitting; and
a manual or electric jackscrew drive.

5. The jack of claim 4 wherein the grease fitting is a zerk fitting.

6. The jack of claim 4 wherein the jackscrew drive is manual.

7. The jack of claim 4 wherein the jackscrew drive is an electric motor.

8. The jack of claim 4 wherein
the jackscrew drive is part of a tongue jack.

9. A method of lubricating a jackscrew assembly comprising an outer tube, an inner tube assembly with an inner tube, a jack drive nut with a wall and interior threads, the jack drive nut fixed relative to the inner tube, and a jackscrew with threads which are threaded through the jack drive nut, the method comprising
providing a recessed lubrication cavity on the jack drive nut, the lubrication cavity comprising a grease fitting:
providing an inner tube access port on the inner tube, such that the inner tube access port is aligned with the lubrication cavity grease fitting:
providing an outer tube access port on the outer tube;
aligning the inner tube access port with the outer tube access port; and
applying a lubricant through the wall of the jack drive nut to the recessed grease fitting, thereby applying the lubricant to the threads of the jackscrew and interior threads of the jack drive nut.

10. The jack of claim 4 wherein
the jackscrew drive is part of a 5th wheel jack.

11. The method of claim 9 further comprising
providing a zerk fitting in the lubrication cavity.

* * * * *